United States Patent
Endo et al.

(10) Patent No.: US 11,952,057 B2
(45) Date of Patent: Apr. 9, 2024

(54) MOTOR CONTROL SYSTEM AND POWER STEERING SYSTEM

(71) Applicant: NIDEC CORPORATION, Kyoto (JP)

(72) Inventors: Shuji Endo, Kyoto (JP); Tokuji Tatewaki, Kanagawa (JP); Tomoya Ueda, Kyoto (JP); Masanori Watahiki, Kyoto (JP); Tomonari Mori, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 904 days.

(21) Appl. No.: 16/970,382

(22) PCT Filed: Feb. 13, 2019

(86) PCT No.: PCT/JP2019/004937
§ 371 (c)(1),
(2) Date: Aug. 17, 2020

(87) PCT Pub. No.: WO2019/163588
PCT Pub. Date: Aug. 29, 2019

(65) Prior Publication Data
US 2020/0406957 A1  Dec. 31, 2020

(30) Foreign Application Priority Data

Feb. 20, 2018 (JP) ................................. 2018-028069
Mar. 30, 2018 (JP) ................................. 2018-068927

(51) Int. Cl.
*B62D 5/00* (2006.01)
*B62D 5/04* (2006.01)
(Continued)

(52) U.S. Cl.
CPC ............. *B62D 5/046* (2013.01); *B62D 6/008* (2013.01); *H02P 23/04* (2013.01); *H02P 27/06* (2013.01)

(58) Field of Classification Search
CPC ......... B62D 5/046; B62D 6/008; H02P 23/04; H02P 27/06
(Continued)

(56) References Cited

U.S. PATENT DOCUMENTS

2006/0170888 A1  8/2006 Asano
2008/0018278 A1* 1/2008 Ta .......................... H02P 21/06
                                                        318/400.17
(Continued)

FOREIGN PATENT DOCUMENTS

JP   200464909 A   2/2004
JP   201057217 A   3/2010
JP   201150118 A   3/2011

OTHER PUBLICATIONS

International Search Report in PCT/JP2019/004937, dated Apr. 9, 2019. 4pp.

*Primary Examiner* — Mahmoud S Ismail
(74) *Attorney, Agent, or Firm* — HAUPTMAN HAM, LLP (57) ABSTRACT

A motor control system includes an inverter, a voltage control calculating a voltage command value indicating a voltage to be applied to a motor from the inverter based on a deviation between the current command value and the actual current detection value, and a torque ripple compensation unit adding a compensation value for compensating a torque ripple in the motor to a signal value on an upstream side in a signal flow that passes through the voltage control unit. The torque ripple compensation unit includes a phase compensator calculating a compensation value component in the voltage control unit based on an actual angular velocity value indicating an angular velocity at which the motor rotates, and an inverse characteristic processor calculating a compensation value component for compensating (Continued)

the torque ripple based on an inverse characteristic of an open loop transfer function in a feedback control.

5 Claims, 7 Drawing Sheets

(51) Int. Cl.
*B62D 6/00* (2006.01)
*H02P 23/04* (2006.01)
*H02P 27/06* (2006.01)

(58) Field of Classification Search
USPC .......................................................... 701/41
See application file for complete search history.

(56) References Cited

U.S. PATENT DOCUMENTS

| | | | | |
|---|---|---|---|---|
| 2012/0306411 | A1* | 12/2012 | Tadano | H02P 21/13 |
| | | | | 318/400.02 |
| 2013/0099707 | A1* | 4/2013 | Okubo | H02P 6/10 |
| | | | | 318/400.23 |
| 2020/0044557 | A1* | 2/2020 | Ohori | G06F 17/147 |
| 2020/0382032 | A1* | 12/2020 | Takase | H02P 21/05 |

\* cited by examiner

Fig.7

MOTOR CONTROL SYSTEM AND POWER STEERING SYSTEM

CROSS-REFERENCE TO RELATED APPLICATIONS

This is the U.S. national stage of application No. PCT/JP2019/004937, filed on Feb. 13, 2019, and priority under 35 U.S.C. § 119(a) and 35 U.S.C. § 365(b) is claimed from Japanese Application No. 2018-028069, filed on Feb. 20, 2018, and Japanese Application No. 2018-068927, filed on Mar. 30, 2018.

FIELD OF THE INVENTION

The present disclosure relates to a motor control system and a power steering system.

BACKGROUND

Conventionally, as a motor control technique, a method in which a control device feedback-controls a motor using a command value is known. For example, a configuration is known in which a control device feeds back a current command value having a phase opposite to the torque ripple and adds the current command value to a basic command value. In such a configuration, a method is known in which the control device superimposes a current command value of a harmonic component of the current value on the basic command value to compensate the torque ripple.

However, the feedback control in the conventional configuration has a problem in that it functions effectively in a frequency range in which a current controller responds at a sufficient speed, but does not function in the high frequency range in which the response of the current controller is delayed. Generally, the responsivity of a current controller is designed to such a degree that the current controller can respond to a possible frequency band of the fundamental wave (sine wave) of the current, which is a practical basis. Additionally, a general torque ripple is a harmonic component of a sine wave of a basic current. For this reason, in the current controller designed as described above, the responsivity of the current controller is insufficient and torque ripple compensation cannot be sufficiently performed.

SUMMARY

An exemplary motor control system of the present invention is a motor control system for driving a motor having a phase number n of three or more, including an inverter that drives the motor, and a control calculation unit that calculates a current command value indicating a current to be supplied to the motor from the inverter on the basis of a target current command value given from the outside as a control target of the motor, and feeds back an actual current detection value indicating a current supplied to the motor from the inverter to the current command value to feedback-control the inverter, in which the control calculation unit includes a voltage control calculation unit that calculates a voltage command value indicating a voltage to be applied to the motor from the inverter on the basis of a current deviation between the current command value and the actual current detection value, and a torque ripple compensation calculation unit that adds a compensation value for compensating a torque ripple in the motor to a signal value on an upstream side in a signal flow that passes through the voltage control calculation unit, and the torque ripple compensation calculation unit includes a phase compensator that calculates a compensation value component in the voltage control calculation unit on the basis of an actual angular velocity value indicating an angular velocity at which the motor rotates, and an inverse characteristic calculation processor that calculates a compensation value component for compensating the torque ripple on the basis of an inverse characteristic of an open loop transfer function in the feedback control.

An exemplary power steering system of the present invention includes the motor control system, a motor controlled by the motor control system, and a power steering mechanism driven by the motor.

The above and other elements, features, steps, characteristics and advantages of the present disclosure will become more apparent from the following detailed description of the preferred embodiments with reference to the attached drawings.

DETAILED DESCRIPTION

Hereinafter, embodiments of a controller of the present disclosure, a motor control system including the controller, and an electric power steering system including the motor control system will be described in detail with reference to the accompanying drawings. Note, however, that in order to avoid the following description from being unnecessarily redundant and to facilitate understanding of those skilled in the art, a detailed description more than necessary may be omitted in some cases. For example, detailed descriptions of well-known matters and duplicate description of substantially the same configuration may be omitted.

A motor control system according to a first embodiment in which the output of a torque ripple compensation calculation unit is a "current value" will be described. A motor control system of the first embodiment is a control system that controls a three-phase brushless motor, for example. Hereinafter, for convenience, a case where a d-axis current Id and a q-axis current Iq are both positive, that is, a case where the rotation is in one direction will be described. The motor control system of the present embodiment is mainly capable of reducing torque ripple.

Generally, the q-axis current Iq has a larger influence on the torque generation in the three-phase motor than the d-axis current Id. For this reason, in order to reduce the torque ripple, it is preferable to mainly control the q-axis current Iq and apply this control system. Note that even in the case of a control system that reduces an induced voltage (BEMF: back electromotive force), feedback control can be performed with a similar configuration as the present invention. That is, in the control method of the present invention, it is possible to either use only the q-axis current as a command value, or use both the q-axis current Iq and the d-axis current Id as command values. Note that in this description, the explanation of the control method regarding the d-axis current Id is omitted.

Figure 1:
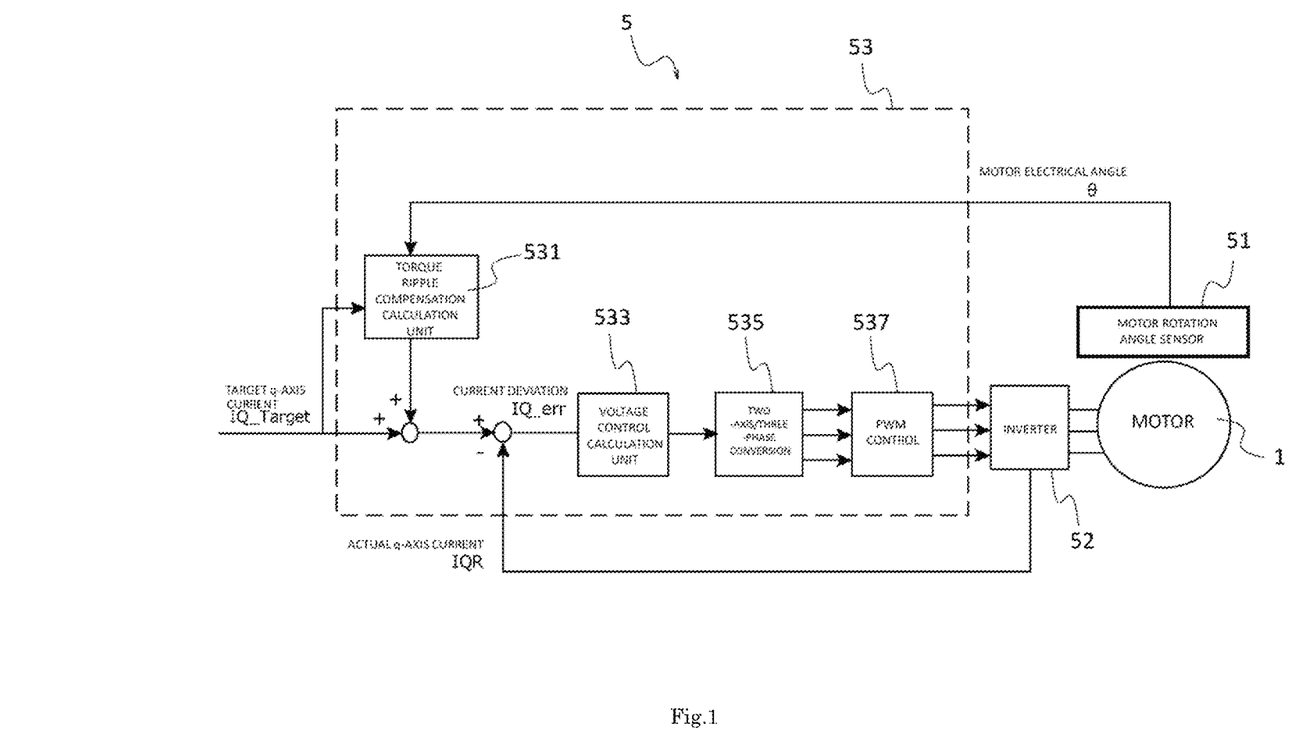
FIG. 1 is a schematic diagram of a motor control system of a first embodiment.
Figure 2:
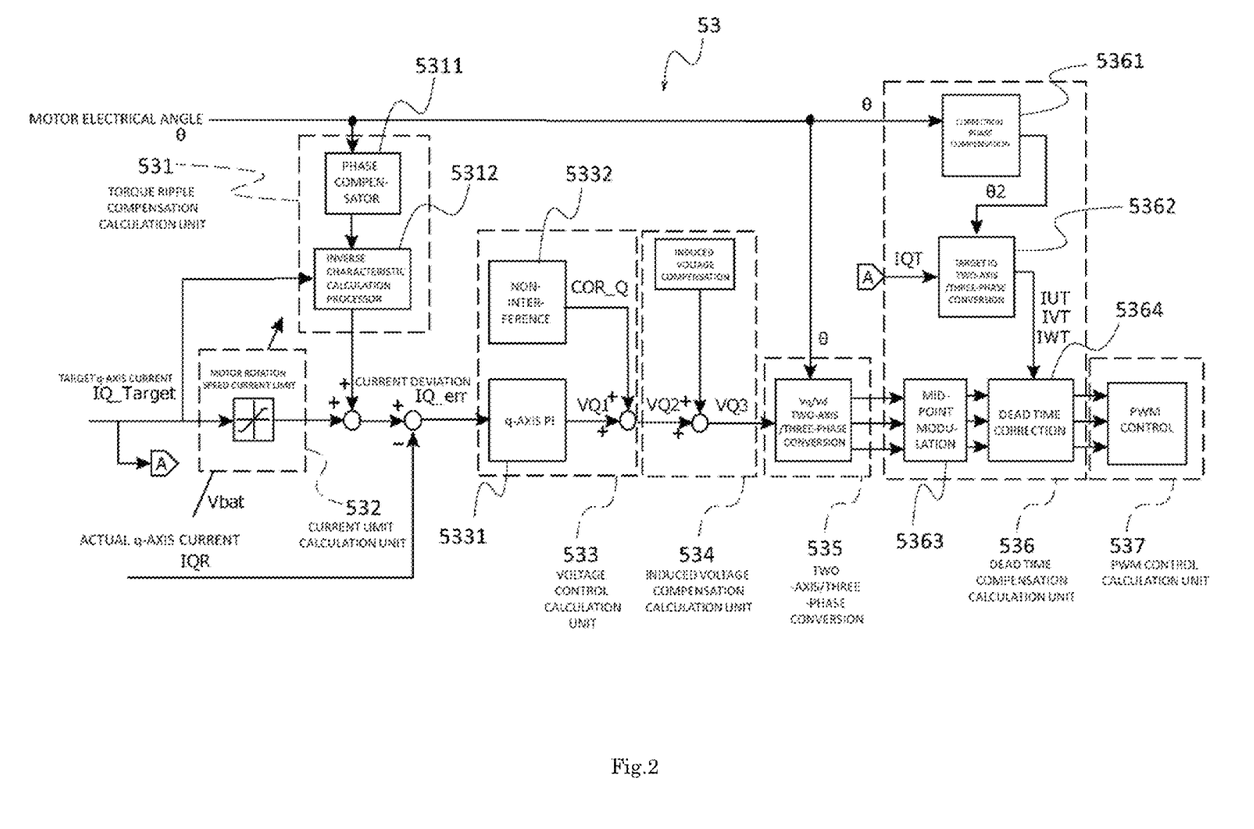
FIG. 2 is a schematic diagram of a control calculation unit of the first embodiment.

FIG. 1 is a schematic diagram of a motor control system of the first embodiment, and FIG. 2 is a schematic diagram of a control calculation unit of the first embodiment. As shown in FIG. 1, a motor control system 5 includes a motor rotation angle sensor 51, an inverter 52, and a control calculation unit 53. The control calculation unit 53 functions as a so-called current controller. As shown in FIG. 2, the control calculation unit 53 includes a torque ripple compensation calculation unit 531, a current limit calculation unit 532, a voltage control calculation unit 533, an induced voltage compensation calculation unit 534, a two-axis/three-phase conversion unit 535, a dead time compensation calculation unit 536, and a PWM control calculation unit 537.

The motor control system 5 controls a motor 1 through the inverter 52. The motor 1 has a rotor 3, a stator 2, and a motor rotation angle sensor 51. The motor rotation angle sensor 51 detects the rotation angle of the rotor 3 of the motor 1. The detected rotation angle of the rotor is represented by an arbitrary angle unit, and is appropriately converted from a mechanical angle to a motor electrical angle θ or from a motor electrical angle θ to a mechanical angle. The relationship between the mechanical angle and the motor electrical angle θ is expressed by the following relational expression: motor electrical angle θ=mechanical angle× (number of magnetic poles/2). Note that as a sensor for detecting the rotation of the motor, an angular velocity sensor may be provided instead of the rotation angle sensor.

The motor control system 5 of the present embodiment performs control to feed back the current value (actual q-axis current value IQR) flowing in the inverter 52. Additionally, although not shown, the motor control system 5 can further perform known arithmetic processing such as field weakening control. The motor control system 5 can suppress torque fluctuation in the motor 1 by performing field weakening control.

A target q-axis current Iq_target is input to the motor control system 5 from the outside. An increase or decrease in the motor output is instructed from the outside by increasing or decreasing the target q-axis current Iq_target. The motor control system 5 performs current limiting on the input target q-axis current Iq_target. The current limiting is processed by the current limit calculation unit 532. The current limit calculation unit 532 receives the target q-axis current Iq_target and performs adaptive control to limit the target q-axis current Iq_target (output value) to a predetermined current value or less.

When the target q-axis current Iq_target is not limited and exceeds the predetermined current value, the motor applied voltage may be saturated as a result of processing described later. When the motor applied voltage is saturated in this way, there is no room for adding a compensation current that suppresses motor torque fluctuation to the target q-axis current Iq_target. As a result, there is a problem that the torque ripple sharply increases and operating noise is generated. In order to avoid this problem, it is effective to leave room for the compensation current by limiting the target q-axis current Iq_target by the current limit calculation unit 532. The saturation of the motor applied voltage occurs depending on both the motor current and the motor rotation angular velocity. For this reason, the current limit calculation unit 532 of the present embodiment limits the motor current (target q-axis current Iq_target) using a function having the motor rotation angular velocity as a parameter. By performing such current limiting, room for compensation for the torque ripple is ensured at all times (when voltage is not saturated). For this reason, quiet and smooth rotation of the motor is achieved.

More specifically, the adaptive control by the current limit calculation unit 532 reduces the range with a function having the motor rotation angular velocity as a parameter. This function is a continuous function with respect to the input target q-axis current Iq_target. That is, the current limit calculation unit 532 does not perform a discontinuous limit such as cutting the peak value of the current, but performs a continuous range reduction of limiting the current more largely for a larger input current value. Note that the function used for the range reduction in the current limit calculation unit 532 may either be a function representing a linear reduction or a function representing a nonlinear (and continuous) reduction. The reduction width of the range reduction is the reduction width for reducing a current value i so that the following inequality is satisfied.

$$V\text{sat} > (Ls+R)i + ke\omega \qquad (1)$$

Here, Vsat is the saturation voltage, Ls is the inductance of the motor, R is the resistance of the motor, and keω is the induced voltage accompanying the rotation of the motor. Additionally, in the adaptive control by the current limit calculation unit 532, when driven by a battery power supply, the current limit value due to the range reduction is a limit value according to a battery voltage Vbat. The battery power supply is used when the supply amount by an alternator becomes insufficient. Since the battery power supply has an internal resistance, the internal resistance changes due to deterioration of the battery power supply and the effective output voltage changes. For this reason, adaptive control is performed according to the battery voltage Vbat.

The motor control system 5 performs torque ripple compensation control on the basis of an angular velocity ω. The torque ripple compensation control is processed by the torque ripple compensation calculation unit 531. The torque ripple compensation calculation unit 531 has a phase compensator 5311 and an inverse characteristic calculation processor 5312. The torque ripple compensation calculation unit 531 first calculates, in the phase compensator 5311, an adjustment value for use in advance angle control for adjusting the phase of the current on the basis of the angular velocity co of the rotor. The angular velocity co is calculated on the basis of the rotation angle (motor electrical angle θ) of the rotor 3 detected by the motor rotation angle sensor 51. Moreover, the torque ripple compensation calculation unit 531 performs, in the inverse characteristic calculation processor 5312, based on the adjustment value, calculation using a transfer function (inverse transfer function) having a characteristic inverse to the linear elements of a controller element C (S) and a plant element P (S) in the motor control system 5, and calculates a torque ripple compensation value for suppressing the torque ripple. The plant element P (S) is a transfer function of the coupling of the motor and the inverter.

Although details will be described later, in the present embodiment, it is possible to include all of the transfer functions in processing such as PI control, induced voltage compensation, two-axis/three-phase conversion, dead time compensation, and PWM control in the controller element C (S), or to treat only the main blocks that perform feedback control as the controller element C (S). That is, processing such as two-axis/three-phase conversion and PWM control is conversion processing of a voltage expression format, and in terms of a transfer function, is regarded almost as an identity function compared to PI control and the plant element P (S). The calculation processing based on the inverse characteristic will be described later.

Regarding the induced voltage keω in a voltage equation V=(Ls+R)i+keω as a disturbance, the plant element P (S) and the controller element C (S) in the first embodiment are represented by the following expressions (2) and (3). Here, Lq represents the q-axis inductance of the motor, and Rq represents the q-axis component of the resistance in the motor.

[Numerical Expression 1]

$$C(s) \qquad (2)$$

[Numerical Expression 2]

$$P(s) = \frac{1}{L_q s + R_q} \qquad (3)$$

Additionally, the linear elements of the plant element P (S) and the controller element C (S) are represented by the following expression (4).

[Numerical Expression 3]

$$\frac{C(s)P(s)}{1 + C(s)P(s)} \qquad (4)$$

As is clear from expression (4), in the present embodiment, a transfer function C (S) and a transfer function P (S) are coupled in series. Additionally, since feedback control is performed in the present embodiment, expression (4) represents a so-called open loop transfer function. A transfer function G (S) having a characteristic inverse to the transfer function of the linear elements of the plant element P (S) and the controller element C (S) represented by expression (4) is represented by the following expression (5).

[Numerical Expression 4]

$$G(s) = \frac{1 + C(s)P(s)}{C(s)P(s)} \qquad (5)$$

Based on the derived relational expression, the torque ripple compensation calculation unit 531 calculates, in the inverse characteristic calculation processor 5312, the torque ripple compensation value from the inverse transfer function G (S). Note that the inverse transfer function G (S) may be obtained from the transfer function of the plant element P (S) and the controller element C (S) of each product obtained by individual measurement before product shipment, or from the transfer function of the plant element P (S) and the controller element C (S) obtained by simulation based on design values, for example. Alternatively, as the inverse transfer function G (S), the transfer characteristic of the plant element P (S) and the controller element C (S) for the same type of motor 1 and motor control system 5 may be measured as a representative value or an average value, for example, and the inverse transfer function G (S) calculated on the basis of the above transfer characteristic may be universally used for the same type of motor 1. Alternatively, a general-purpose inverse transfer function G (S) may be adopted for multiple types of motors 1 and motor control systems 5 known to have similar transfer characteristics of the plant element P (S) and the controller element C (S). Both the inverse transfer function G (S) based on measurement and the inverse transfer function G (S) based on calculation may be determined by taking into account some error or approximation. Additionally, a correction may be made by using adaptive control or the like. By adopting the configuration in which the inverse transfer function G (S) is used to calculate the torque ripple compensation value, there is an advantage that design at the time of manufacturing such as board design is simplified.

The motor control system 5 adds the torque ripple compensation value generated by the torque ripple compensation calculation unit 531 to the q-axis current command value output from the current limit calculation unit 532. As a result, torque ripple compensation based on the q-axis current value is performed. Moreover, the motor control system 5 feeds back the actual q-axis current value IQR flowing in the inverter (or motor), and subtracts the actual q-axis current value IQR from the command value of the q-axis current to which the torque ripple compensation value has been added as described above, to calculate the current deviation IQ_err of the q-axis current. That is, the motor control system 5 performs feedback control for calculating the current deviation IQ_err.

Note that while the torque ripple compensation value is added to the target q-axis current Iq_target after current limiting in the above description, the torque ripple compensation value may be added to the target q-axis current Iq_target before current limiting and the current limiting may be performed thereafter, or the torque ripple compensation value may be added to the current deviation IQ_err between the target q-axis current Iq_target and the actual q-axis current value IQR.

As described above, the motor control system 5 of the first embodiment performs the torque ripple compensation for compensating the responsivity (transfer function) of the current controller in advance. That is, the motor control system 5 uses feedback control, and performs current phase compensation and multiplies the phase-compensated value by the transfer function having the inverse characteristic of the linear elements of the plant element P (S) and the controller element C (S) to obtain the torque ripple compensation value for compensating the torque ripple. In the present embodiment, the transfer function having the inverse characteristic is a first-order lag element. The obtained torque ripple compensation value is superimposed on the target q-axis current IQ_Target. As a result, the torque ripple generated in the motor is reduced, and degradation of operating noise is prevented. Moreover, the robustness of the motor control system is also improved.

Note that when torque ripple compensation is performed, the value for which the phase correction has been performed is multiplied by a transfer function having an inverse characteristic, so that the sensor noise may be amplified. For this reason, a noise filter may further be arranged before or after the block of the transfer function having the inverse characteristic, and a configuration may be used in which the signal having passed through the noise filter is input to the transfer function having the inverse characteristic, or the output value of the block of the transfer function having the inverse characteristic passes through the noise filter. Alternatively, processing such as signal smoothing may be performed on the q-axis current value before being input to the block of the transfer function having the inverse characteristic. As a result, the noise value is reduced and a lower operating noise is achieved.

Additionally, in the torque ripple compensation calculation unit 531, in addition to the phase compensation processing and the inverse transfer function processing for the series-coupled transfer function of the controller element C (S) and the plant element P (S), other compensation values using a lookup table or the like may be calculated and output. For example, the torque ripple compensation calculation unit 531 may have a lookup table that refers to and outputs a predetermined value on the basis of at least one of the target q-axis current command value IQ_Target and the angular velocity ω. For example, a gain α for adjusting the amplitude of the torque ripple may be output from the lookup table. A value using this gain α and an element that is the sixth-order component of the q-axis current such as α sin 6θ may be used to calculate another compensation value in the inverse characteristic calculation processor 5312, or another compensation value may be further superimposed on the output of the inverse characteristic calculation processor 5312, or another compensation value may be used in the phase compensation. That is, it is possible to include all the compensation elements (advance angle, amplitude, and the like) in the inverse transfer function described above, or to calculate only the compensation of some elements.

As the method for compensating the torque ripple using the antiphase component of the current value described above, there are known a method of adding a compensation value to a motor current command value and a method of adding a compensation value to a motor applied voltage command value. In the present embodiment, the compensation value is added to the motor current command value. As a result, stable torque fluctuation correction is performed regardless of motor characteristic fluctuations.

After obtaining the current deviation IQ_err of the q-axis current as described above, the motor control system 5 performs voltage control for calculating a motor applied voltage command value on the basis of the current deviation IQ_err of the q-axis current. Voltage control is performed by the voltage control calculation unit 533. In the present embodiment, PI control is used as voltage control. Note that the voltage control is not limited to PI control, and other control methods such as PID control may be adopted. The voltage control calculation unit 533 calculates a q-axis voltage command value VQ1 by a q-axis PI control unit 5331 on the basis of the current deviation IQ_err of the q-axis current, and adds a non-interference element COR_Q output from a non-interference processing unit 5332 to the q-axis voltage command value VQ1 to calculate a q-axis voltage command value VQ2. The non-interference element COR_Q is a current element added to prevent the d-axis current (voltage) and the q-axis current (voltage) from interfering with each other, for example.

Then, the motor control system 5 performs induced voltage compensation on the q-axis voltage command value VQ2. Induced voltage compensation is performed by the induced voltage compensation calculation unit 534. When driving the motor, the motor is controlled in consideration of the influence of the induced voltage of the motor in addition to the current flowing through the motor. The induced voltage compensation calculation unit 534 performs advance angle control based on the reciprocal of the induced voltage (BEMF) generated in the motor to compensate the induced voltage (BEMF).

That is, the induced voltage compensation calculation unit 534 obtains the reciprocal of the induced voltage (BEMF) generated in the motor, and based on the reciprocal, calculates the compensation value for performing compensation (advance angle compensation) to adjust the advance angle of the voltage (or current). In the present embodiment, the induced voltage compensation calculation unit 534 adds the compensation value for the induced voltage compensation to the q-axis voltage command value VQ2 to calculate a q-axis voltage command value VQ3. Note that if a compensation value based on the reciprocal of the induced voltage model is used, the compensation value may be subtracted from the q-axis voltage command value VQ2 instead of being added. Additionally, this compensation value may be added to the voltage value of each phase after the two-axis/three-phase conversion.

Moreover, the motor control system 5 performs two-axis/three-phase conversion on the q-axis voltage command value VQ3. Two-axis/three-phase conversion is performed by the two-axis/three-phase conversion calculation unit 535 on the basis of the motor electrical angle θ. The two-axis/three-phase conversion calculation unit 535 calculates the corresponding q-axis voltage and d-axis voltage on the basis of the q-axis voltage command value VQ3, and converts the voltages into voltage command values in three phases, the U, V, and W phases.

After that, the motor control system performs dead time compensation on the basis of the voltage command value of each phase output from the two-axis/three-phase conversion calculation unit 535. Dead time compensation is performed by the dead time compensation calculation unit 536. First, the dead time compensation calculation unit 536 performs, in a midpoint modulation unit 5363, calculation by midpoint modulation in which a higher harmonic (e.g., third harmonic) that is n times the fundamental wave of the voltage is superimposed. Here, n is a positive integer. By performing the midpoint modulation, the voltage waveform approaches a trapezoidal waveform from a sine waveform. This improves the effective voltage ratio in the inverter 52.

Next, the dead time compensation calculation unit 536 performs dead time compensation. Up to the midpoint modulation unit 5363, the above-described processing for the current deviation IQ_err is performed, and a voltage component that reduces the current deviation IQ_err is calculated. On the other hand, a target IQ two-axis/three-phase conversion unit 5362 receives the target q-axis current Iq_target, and performs two-axis/three-phase conversion on the voltage command value corresponding to the target q-axis current Iq_target. That is, the target IQ two-axis/three-phase conversion unit 5362 calculates the q-axis voltage and d-axis voltage corresponding to the target q-axis current Iq_target, and converts the voltages into voltage command values in three phases, the U, V, and W phases.

Similar to the two-axis/three-phase conversion in the two-axis/three-phase conversion calculation unit 535, the motor electrical angle is also used in the calculation in the two-axis/three-phase conversion of the target IQ two-axis/three-phase conversion unit 5362. Note, however, that in the motor control system 5 of the present embodiment, a motor electrical angle θ2 obtained by subjecting the motor electrical angle θ detected by the sensor to phase compensation is used as the motor electrical angle input to the target IQ two-axis/three-phase conversion unit 5362. The phase compensation is performed by a correction phase compensator 5361, and the phase compensation is performed to compensate the phase shift of the voltage due to the rotation of the motor.

Finally, the motor control system performs PWM control on the basis of voltage command values output from the dead time compensation calculation unit 536. A PWM control command value is calculated by the PWM control calculation unit 537. The PWM control calculation unit 537 controls the voltage of the inverter 52 on the basis of the calculated command value. By the PWM control, a current corresponding to the above-mentioned current command value flows to the motor 1. Note that as described above, the actual q-axis current value IQR flowing in the inverter 52 is fed back.

Note that in the present system, processing such as the PI control, the induced voltage compensation, the two-axis/three-phase conversion, the dead time compensation, and the PWM control described above is not limited to the above, and a known technique may be applied as the processing. Additionally, in the present system, these compensations and controls may be omitted if necessary. Additionally, as described above, a combination of these elements (i.e., processing such as the above-mentioned PI control, induced voltage compensation, two-axis/three-phase conversion, dead time compensation, and PWM control) is the controller element C (S). Note that a combination of the motor and the inverter is the plant element P (S).

Figure 3:
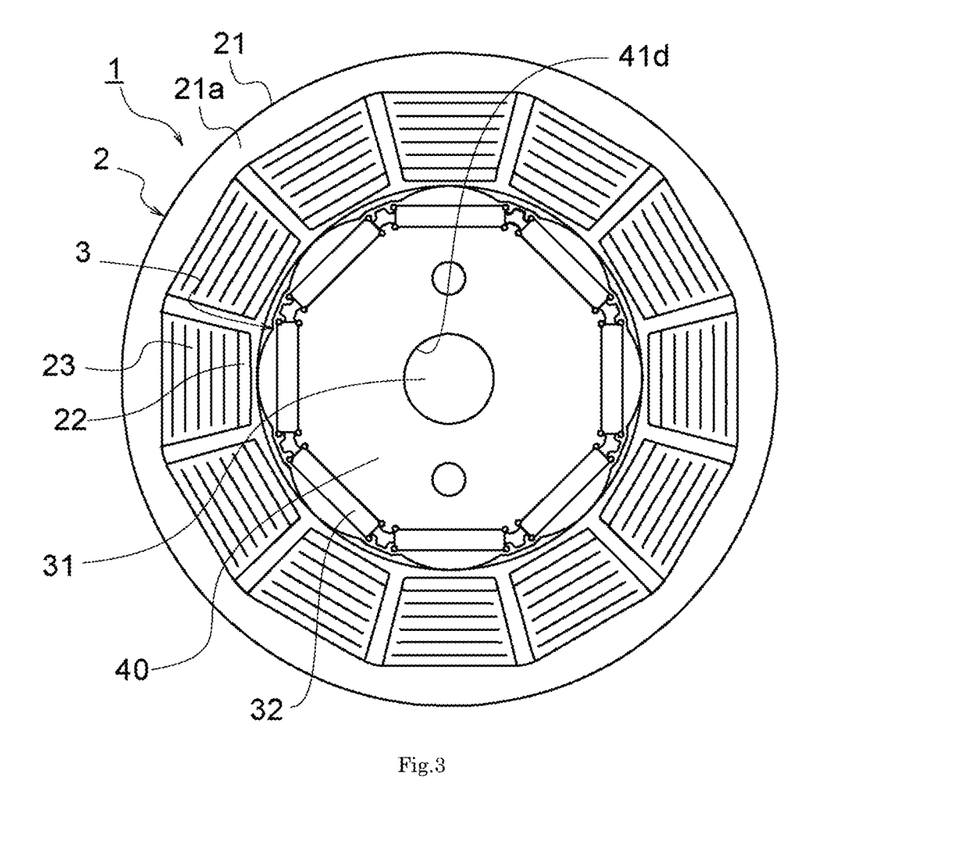
FIG. 3 is a plan view of a first motor according to the present embodiment.
Figure 4:
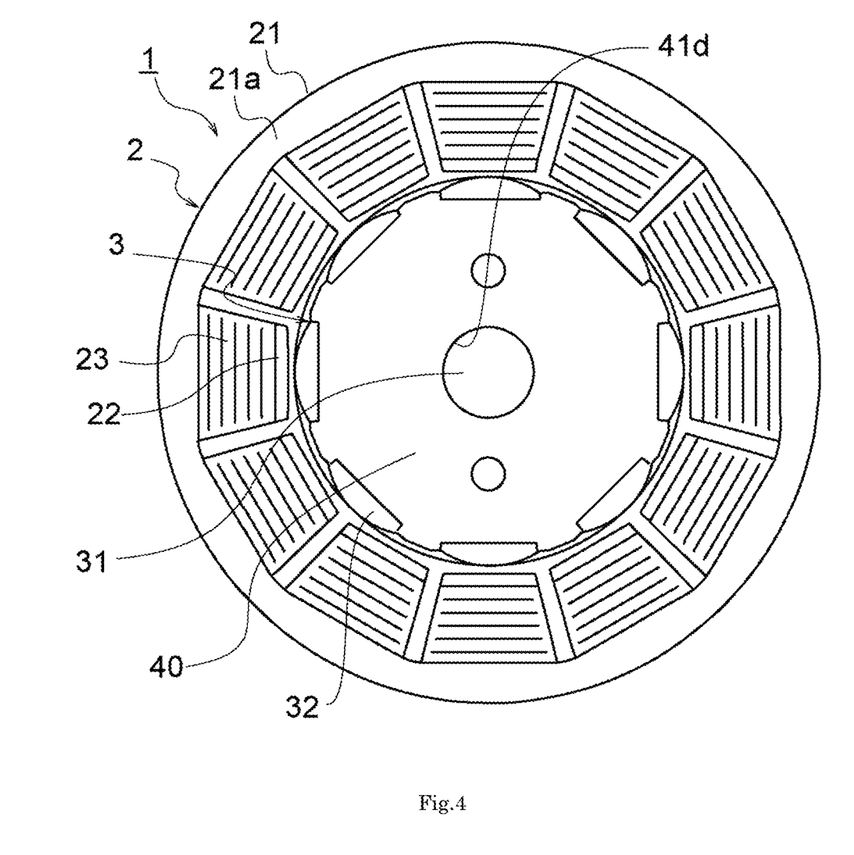
FIG. 4 is a plan view of a second motor according to the present embodiment.

Here, an outline of a motor that can be controlled by the above-described embodiments will be described. FIG. 3 is a plan view of a first motor according to the present embodiment, and FIG. 4 is a plan view of a second motor according to the present embodiment. Each of motors 1 shown in FIGS. 3 and 4 has a stator 2 and a rotor 3. As shown in FIGS. 3 and 4, the motor 1 is an inner rotor. Note that in addition to the inner rotor, an outer rotor structure may be adopted as the motor 1. The first motor 1 shown in FIG. 3 is an interior permanent magnet (IPM) motor, and the second motor 1 shown in FIG. 4 is a surface permanent magnet (SPM) motor.

The stator 2 has a cylindrical outer shape extending in the axial direction. The stator 2 is arranged outside the rotor 3 in the radial direction with a predetermined gap from the rotor 3. The stator 2 has a stator core 21, an insulator 22, and a coil 23. The stator core 21 is a tubular member extending in the axial direction. The stator core 21 is formed by stacking multiple magnetic steel plates in the axial direction. The stator core 21 has a core back 21a and teeth (not shown). The core back 21a is a ring-shaped portion. The teeth extend radially inward from an inner peripheral surface of the core back 21a. Multiple teeth are arranged side by side at predetermined intervals in the circumferential direction. Additionally, the space between adjacent teeth is called a slot S. In the motor 1 shown in FIGS. 3 and 4, 12 slots S are provided, for example.

The rotor 3 has a cylindrical outer shape extending in the axial direction. The rotor 3 is arranged inside the stator 2 in the radial direction with a predetermined gap from the stator 2. The rotor 3 has a shaft 31, a rotor core 40, and a magnet 32. The rotor 3 rotates about the shaft 31 extending in the up-down direction (direction perpendicular to sheet surface of FIGS. 3 and 4). The rotor core 40 is a cylindrical member extending in the axial direction. The shaft 31 is inserted into a hole 41d located at the center of the rotor core 40 in the radial direction. The rotor core 40 is configured by stacking multiple magnetic steel plates in the axial direction. The magnet 32 is arranged inside the rotor core 40 in the first motor 1 shown in FIG. 3, and is attached to the surface of the rotor core 40 in the second motor 1 shown in FIG. 4. Multiple magnets 32 are arranged side by side at predetermined intervals in the circumferential direction. In each of the motors 1 shown in FIGS. 3 and 4, eight magnets 32 are provided, for example. That is, in each of the motors 1 shown in FIGS. 3 and 4, the number of poles P is eight.

The magnetic characteristic of the motor differs depending on the number of poles P and the number of slots S described above. Here, causes of operating noise mainly include radial force and torque ripple. In the case of an 8P12S motor having eight poles P and 12 slots S, radial forces that are radial components of the electromagnetic force generated between the rotor and the stator cancel out each other, and therefore torque ripple is the main cause of operating noise. In other words, by compensating the torque ripple alone with the motor control system described above, the operating noise of the 8P12S motor is efficiently reduced. Accordingly, the motor control system of the present invention is particularly useful for 8P12S motors.

Since radial force cancellation is particularly effective in SPM motors, the motor control system of the present invention is particularly useful in SPM motors. More specifically, in SPM motors, reluctance torque does not occur and only magnet torque contributes. For this reason, by adopting the present invention, vibration reduction is achieved by compensating the magnet torque alone. Conversely, since the cancellation of radial force is not an effect that occurs exclusively in SPM motors and 8P12S motors, but is an effect that occurs also in IPM motors or 10P12S motors, for example, the motor control system of the present invention is also useful in IPM motors, or is also useful in 10P12S motors, for example.

Figure 5:
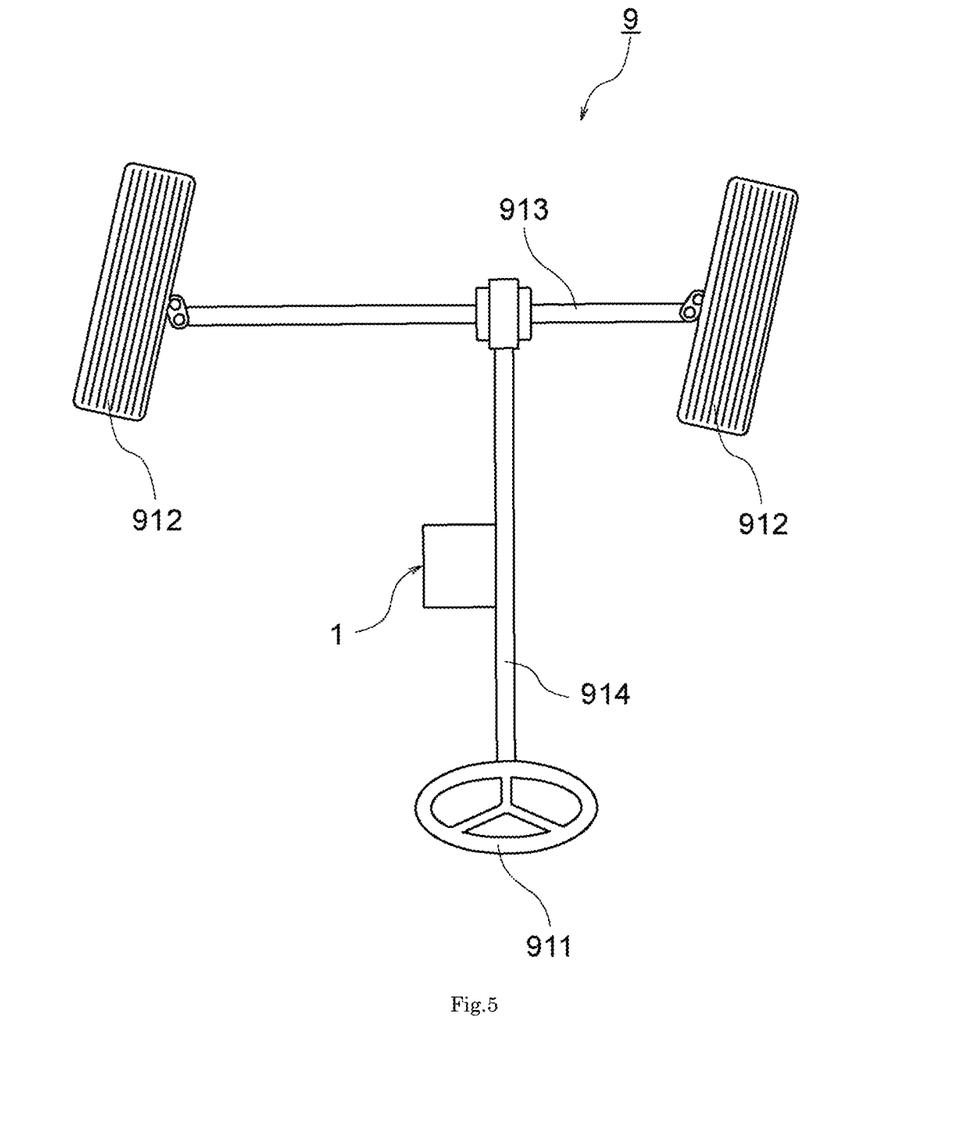
FIG. 5 is a schematic diagram of an electric power steering device.

Next, an outline of an electric power steering device will be described. As shown in FIG. 5, in the present embodiment, a column type electric power steering device will be exemplified. An electric power steering device 9 is mounted on a steering mechanism for vehicle wheels. The electric power steering device 9 is a column-type power steering device that directly reduces the steering force by the power of a motor 1. The electric power steering device 9 includes the motor 1, a steering shaft 914, and an axle 913.

The steering shaft 914 transmits an input from a steering 911 to the axle 913 having wheels 912. The power of the motor 1 is transmitted to the axle 913 through a ball screw. The motor 1 used in the column-type electric power steering device 9 is provided inside an engine room (not shown). Note that while the electric power steering device 9 shown in FIG. 5 is of a column type as an example, the power steering device of the present invention may be of a rack type.

Here, in an application such as the electric power steering device 9 that requires low torque ripple and low operating noise, both effects can be achieved by controlling the motor 1 with the motor control system 5 described above. The reason is that the effect of torque ripple compensation is created by compensating the responsivity of the current controller for the torque ripple of the frequency that exceeds the responsivity of current control without using a high-pass filter that amplifies noise. For this reason, the present invention is particularly useful in a power steering device.

The present invention is also useful for applications other than power steering devices. For example, the present invention is useful for motors such as traction motors (running motors), compressor motors, and oil pump motors that require a reduction in operating noise. Hereinafter, a motor unit including a traction motor will be described.

Figure 6:
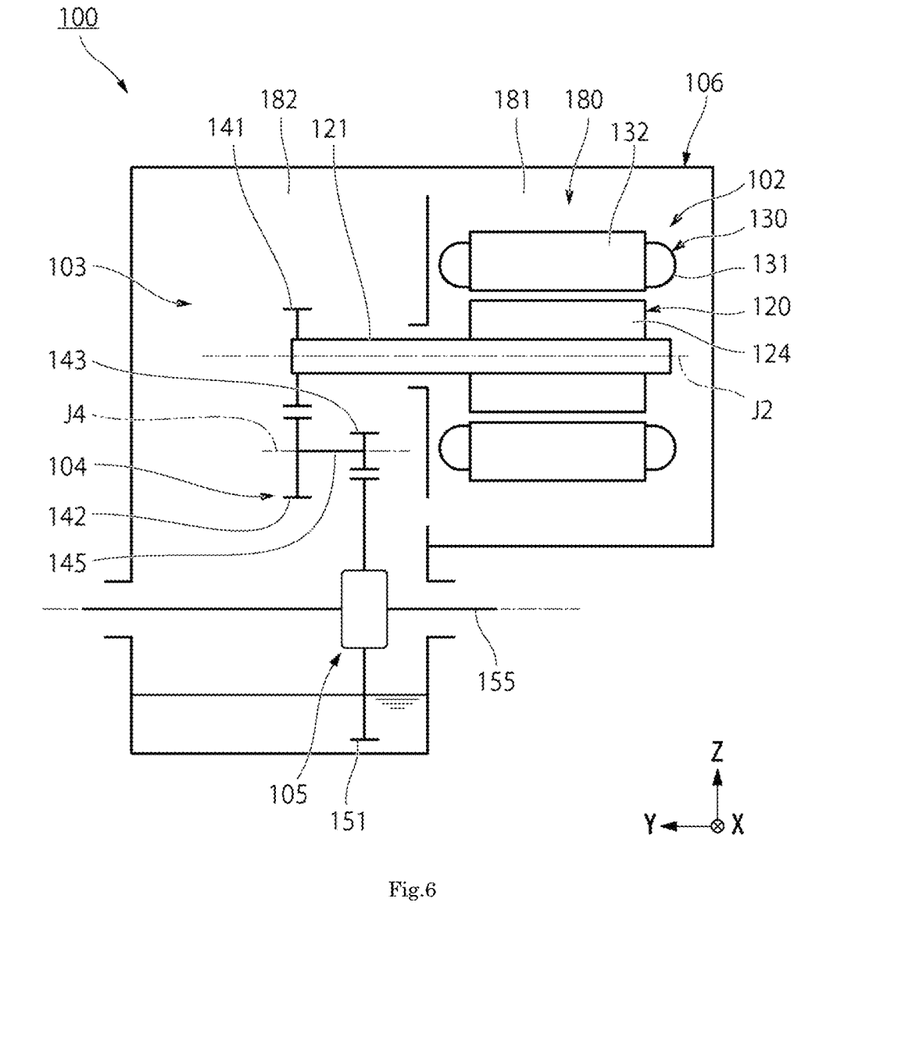
FIG. 6 is a conceptual diagram of a motor unit including a traction motor.
Figure 7:
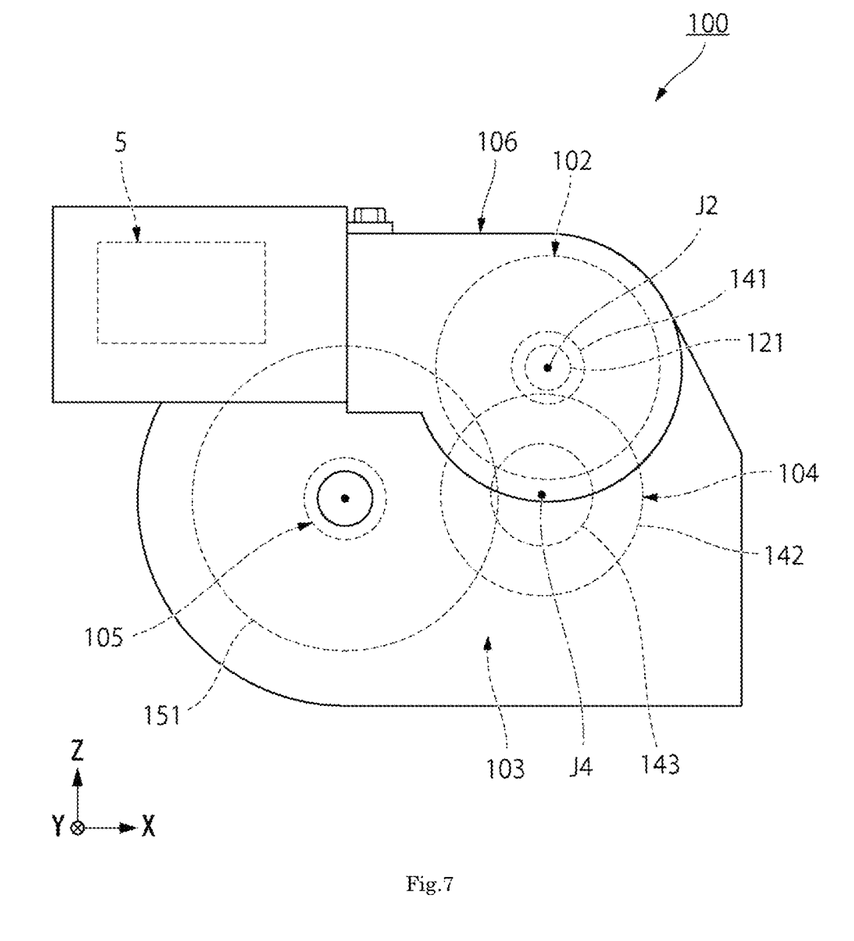
FIG. 7 is a schematic side view of a motor unit.

In the following description, unless otherwise specified, a direction parallel to a motor axis J2 of a motor 102 will be simply referred to by the term "axial direction", radial directions centered on the motor axis J2 will be simply referred to by the term "radial direction", and a circumferential direction centered on the motor axis J2, that is, a circumferential direction about the motor axis J2, will be simply referred to by the term "circumferential direction". Note, however, that the above "parallel direction" includes a substantially parallel direction. FIG. 6 is a conceptual diagram of a motor unit 100 including a traction motor, and FIG. 7 is a schematic side view of the motor unit 100.

The motor unit 100 is installed in a vehicle having a motor as a power source, such as a hybrid electric vehicle (HEV), a plug-in hybrid vehicle (PHV), or an electric vehicle (EV), for example, and is used as the power source thereof. The motor unit 100 of the present embodiment includes a motor (main motor) 102, a gear portion 103, a housing 106, and a motor control system 5.

As shown in FIG. 6, the motor 102 includes a rotor 120 that rotates about a motor axis J2 that extends in the horizontal direction, and a stator 130 that is located radially outside the rotor 120. A housing space 180 for housing the motor 102 and the gear portion 103 is provided inside the housing 106. The housing space 180 is divided into a motor chamber 181 for housing the motor 102 and a gear chamber 182 for housing the gear portion 103.

The motor 102 is housed in the motor chamber 181 of the housing 106. The motor 102 includes the rotor 120 and the stator 130 located outside the rotor 120 in the radial direction. The motor 102 is an inner rotor type motor including the stator 130 and the rotor 120 rotatably arranged inside the stator 130.

The rotor 120 rotates when electric power is supplied to the stator 130 through the motor control system 5 from a battery (not shown). The rotor 120 has a shaft (motor shaft) 121, a rotor core 124, and a rotor magnet (not shown). The rotor 120 (i.e., the shaft 121, the rotor core 124, and the rotor magnet) rotates about the motor axis J2 extending in the horizontal direction. The torque of the rotor 120 is transmitted to the gear portion 103. The shaft 121 extends about a motor axis J2 extending horizontally and in the vehicle width direction. The shaft 121 rotates about the motor axis J2.

The shaft 121 extends across the motor chamber 181 and the gear chamber 182 of the housing 106. One end of the shaft 121 projects toward the gear chamber 182. A first gear 141 is fixed to the end of the shaft 121 protruding into the gear chamber 182.

The rotor core 124 is configured by stacking silicon steel plates (magnetic steel plates). The rotor core 124 is a columnar body extending along the axial direction. Multiple rotor magnets are fixed to the rotor core 124.

The stator 130 surrounds the rotor 120 from the outside in the radial direction. In FIG. 11, the stator 130 has a stator core 132 and a coil 131. The stator 130 is held by the housing 106. Although not shown, the stator core 132 has multiple magnetic pole teeth extending radially inward from an inner peripheral surface of an annular yoke. A coil wire (not shown) is wound around the magnetic pole teeth to form a coil 131.

The gear portion 103 is housed in the gear chamber 182 of the housing 106. The gear portion 103 is connected to the shaft 121 on one axial side of the motor axis J2. The gear portion 103 has a speed reducer 104 and a differential 105. A torque output from the motor 102 is transmitted to the differential 105 through the speed reducer 104.

The speed reducer 104 is connected to the rotor 120 of the motor 102. The speed reducer 104 has a function of increasing the torque output from the motor 102 in accordance with a reduction ratio while reducing the rotation speed of the motor 102. The speed reducer 104 transmits the torque output from the motor 102 to the differential 105.

The speed reducer 104 has a first gear (intermediate drive gear) 141, a second gear (intermediate gear) 142, a third gear (final drive gear) 143, and an intermediate shaft 145. The torque output from the motor 102 is transmitted to a ring gear (gear) 151 of the differential 105 through the shaft 121 of the motor 102, the first gear 141, the second gear 142, the intermediate shaft 145, and the third gear 143.

The differential 105 is connected to the motor 102 through the reducer 104. The differential 105 is a device for transmitting the torque output from the motor 102 to wheels of the vehicle. The differential 105 has a function of transmitting the same torque to axles 155 of right and left wheels while absorbing a difference in speed between the right and left wheels when the vehicle is turning.

The motor control system 5 is electrically connected to the motor 102. The motor control system 5 supplies electric power to the motor 102 with an inverter. The motor control system 5 controls the current supplied to the motor 102. The motor control system 5 compensates the torque ripple to reduce the operating noise of the motor 102.

While embodiments of the present invention and modifications thereof have been described above, it will be understood that features, a combination of the features, and so on according to each of the embodiments and the modifications thereof are only illustrative and not restrictive, and that an addition, elimination, and substitution of a feature(s), and other modifications can be made without departing from the scope and spirit of the present invention. Also note that the present invention is not limited by the embodiments.

The embodiments of the present disclosure can be widely used for various devices including various motors such as a vacuum cleaner, a dryer, a ceiling fan, a washing machine, a refrigerator, and a power steering device.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor control system for driving a motor having a phase number n of three or more, comprising:
    an inverter that drives the motor; and
    a control calculation unit that calculates a current command value indicating a current to be supplied to the motor from the inverter on the basis of a target current command value given from the outside as a control target of the motor, and feeds back an actual current detection value indicating a current supplied to the motor from the inverter to the current command value to feedback-control the inverter, wherein
    the control calculation unit includes
        a voltage control calculation unit that calculates a voltage command value indicating a voltage to be applied to the motor from the inverter on the basis of a current deviation between the current command value and the actual current detection value,
        a torque ripple compensation calculation unit that adds a compensation value for compensating a torque ripple in the motor to a signal value on an upstream side in a signal flow that passes through the voltage control calculation unit, and
    the torque ripple compensation calculation unit includes
        a phase compensator that calculates a compensation value component in the voltage control calculation unit on the basis of an actual angular velocity value indicating an angular velocity at which the motor rotates, and an inverse characteristic calculation processor that calculates a compensation value component for compensating the torque ripple on the basis of an inverse characteristic of an open loop transfer function in the feedback control, and a current limit calculation unit configured to limit the target current command to a predetermined value or less, wherein the current limit calculation unit is upstream of the torque ripple compensation calculation unit, wherein the inverter is configured to control the motor based on the current command value.

2. The motor control system according to claim 1, wherein the motor control system drives an 8P12S motor.

3. The motor control system according to claim 1, wherein the motor control system drives a surface permanent magnet (SPM) motor having a magnet disposed on a surface of a rotor.

4. The motor control system according to claim 1, wherein the motor control system drives a vehicle traveling motor.

5. A power steering system comprising:

a motor control system for driving a motor having a phase number n of three or more, motor control system comprising:

an inverter that drives the motor; and a control calculation unit that calculates a current command value indicating a current to be supplied to the motor from the inverter on the basis of a target current command value given from the outside as a control target of the motor, and feeds back an actual current detection value indicating a current supplied to the motor from the inverter to the current command value to feedback-control the inverter, wherein the control calculation unit includes a voltage control calculation unit that calculates a voltage command value indicating a voltage to be applied to the motor from the inverter on the basis of a current deviation between the current command value and the actual current detection value, a torque ripple compensation calculation unit that adds a compensation value for compensating a torque ripple in the motor to a signal value on an upstream side in a signal flow that passes through the voltage control calculation unit, and the torque ripple compensation calculation unit includes a phase compensator that calculates a compensation value component in the voltage control calculation unit on the basis of an actual angular velocity value indicating an angular velocity at which the motor rotates, and an inverse characteristic calculation processor that calculates a compensation value component for compensating the torque ripple on the basis of an inverse characteristic of an open loop transfer function in the feedback control, and a current limit calculation unit configured to limit the target current command to a predetermined value or less, wherein the current limit calculation unit is upstream of the torque ripple compensation calculation unit, wherein the inverter is configured to control the motor based on the current command value;

a motor controlled by the motor control system; and a power steering mechanism driven by the motor.

* * * * *